3,114,682
Patented Dec. 17, 1963

3,114,682
METHOD OF PREPARING CHROMIUM DIOXIDE
Frederick A. Scott and Lyle K. Mudge, Richland, Wash., assignors to the United States of America as represented by the United States Atomic Energy Commission
No Drawing. Filed Mar. 13, 1962, Ser. No. 179,495
7 Claims. (Cl. 204—1.5)

This invention deals with a process of making uranium dioxide, with the fabrication of refractory ceramic-type uranium dioxide fuel elements for nuclear reactors, and also with the regeneration of such elements after use in the reactors.

Uranium dioxide fuel elements have been prepared heretofore, for instance, by mixing uranium dioxide powders with a binder followed by hot- or cold-pressing; by sintering uranium dioxide at high temperatures; or by compacting the powder without sintering, for instance by vibration, hot-swaging or cold-swaging.

For this purpose uranium dioxide has been made for instance, by a process patented to assignee in Patent No. 3,011,865, granted to Glenn E. Benedict et al. on December 5, 1961, according to which, broadly, the material to be processed is dissolved in molten chloride and the solution obtained is then electrolyzed for deposition of uranium dioxide.

The Benedict et al. method described above has disadvantages. It yields a uranium dioxide that has a molar ratio of oxygen:uranium considerably greater than 2. It is most desirable, however, in particular for the use as fuel elements, that the composition of the uranium dioxide is as close to the theoretical formula $UO_{2.000}$ as possible, because those uranium dioxides that have a considerably higher oxygen ratio are not very stable at the elevated temperatures occurring in nuclear reactors. These "higher" oxides undergo a phase transformation at elevated temperature and also decompose chemically whereby an internal pressure is built up in the fuel element which entails dimensional changes.

It is an object of this invention to provide a process for the preparation of uranium dioxide in which the oxygen:uranium ratio is close to the stoichiometric value of 2.000 and which thus has a good dimensional stability at elevated temperatures.

It is also an object of this invention to provide shaped uranium dioxide pieces with improved resistance to thermal shocks as they occur, for instance, in nuclear reactors.

It is a further object of this invention to provide a uranium dioxide with a high density and unusual crystal structure so that, when used as nuclear fuel, fission-product gases formed cannot migrate within the crystal lattice, but are trapped or "frozen" therein. This high density also permits the use of a greater weight of fuel in a given space.

It is still another object of this invention to provide a process of regenerating neutron-bombarded uranium dioxide fuel which for practical purposes requires as few steps as possible so that remote control is comparatively simple.

It is a further object of this invention to provide a process of making or regenerating shaped uranium dioxide fuel bodies.

It is finally also an object of this invention to provide a process by which a uranium dioxide fuel body characterized by great density and coherence can be prepared directly from technical-grade uranium dioxide powder.

It was found that the extremely dense, coherent uranium dioxide referred to above can be obtained by carrying out an electrolysis for the cathodical deposition of uranium dioxide under conditions which result in continuous redissolution of the cathode deposit. The rate of dissolution must, of course, be less than the rate of deposition. However, the more closely the rate of dissolution approaches the rate of deposition, the more dense the deposit. To secure satisfactory results, the rate of dissolution should be at least 20%, and preferably about 50%, of the rate of deposition. Another finding of importance for accomplishing the end of this invention is that the process must be carried out under completely anhydrous conditions, because the slightest water content causes the formation of small crystals that have a molar oxygen:uranium ratio considerably greater than the desired stoichiometric value.

The process of this invention thus broadly comprises dissolving uranium oxide material to be processed in a system of molten chloride electrolyte, drying the system, usually by sparging the salt mixture with a chlorinating gas, and passing an electric current through the system to deposit uranium dioxide. The chlorinating gas sparge is continued during deposition and causes a continuous redissolution of a portion of the deposited material. The invention more specifically consists in the adjustment of the electrical deposition and chemical redissolution rates and operation under anhydrous conditions. The adjustment of rates is effected by control of temperature, flow of chlorinating gas, electrical potential and/or uranium chloride concentration in the salt, as will be described in detail later.

Many chloride mixtures are suitable as the solvent-electrolyte. The important feature is that they have a relatively low melting point, that is, that they melt at temperatures not higher than 800° C. Mixtures of sodium chloride and potassium chloride, lithium chloride and potassium chloride, magnesium chloride and potassium chloride and potassium chloride and lead chloride were found suitable. The equimolar mixture of sodium-potassium chloride has been used most extensively.

As has been stated before, the salt has to be used in anhydrous condition. This condition can be accomplished by pretreatment, consisting either in sparging of the molten salt with hydrogen chloride or chlorine gas prior to electrolysis or in subjecting the molten salt to an electrolytical pretreatment using reversed polarity. In the latter case needle-shaped uranium dioxide crystals of "nonstoichiometric composition" deposit first at the pretreatment cathode, but after a while crystals of a cubical structure start to deposit, an indication for the system having become anhydrous. At this point the current is reversed, whereby the pretreatment cathode is made the anode proper and vice versa. Stoichiometric $UO_{2.0}$ is then deposited on the new cathode, the cathode proper, while the needle-shaped nonstoichiometric crystals from the pretreatment cathode are dissolved.

The electrical potential must be negative and may range up to —1.5 volts. In the case of the equimolar sodium chloride-potassium chloride mixture and a temperature of 740° C., current densities between 0.04 and 0.2 amp./cm.² were found to bring about optimal results.

As the chlorinating medium, hydrogen chloride gas, chlorine gas and mixtures of these with air were found suitable. Of course, also these gases have to be water-free in order to guarantee an anhydrous condition. Air can be present in the chlorinating agent up to a quantity of about 20% by volume. A gas mixture of 10 volumes of hydrogen chloride and 1 volume of air gave particularly satisfactory results.

It is again emphasized that the factor most important for optimal results is the adjustment of dissolution and deposition rates; the dissolution rate should be approximately half the deposition rate for a product of maximum density and a quasi-ceramic characteristic. While the dissolution rate is primarily increased by an increase in temperature and an increase in the concentration of the chlorinating agent, the deposition rate is increased with increasing potential and increasing uranyl chloride concentration in the salt.

In the absence of a catalyst, the temperature is preferably held in the range of 700 to 800° C. However, a temperature as low as 500° C. can be used.

It was considered advantageous, though optional, to accelerate the redissolution by adding a dissolution catalyst, since the operation then can be carried out at a lower temperature. Thallium chloride, TlCl, and ferric chloride, for instance, were found siutable catalysts for this purpose. The use of these catalysts in the initial dissolution of uranium dioxide in molten salt mixtures is described and claimed in an application of Maurice C. Lambert, filed February 27, 1962, S.N. 176,166. Another means of accelerating dissolution is by superimposing an alternating voltage on the direct voltage, whereby current reversal and dissolution during a small part of the cycle occur.

As mentioned, technical-grade uranium dioxide material as well as neutron-irradiated uranium dioxide can be used as the starting material for the process of this invention. In the latter case, a separation of the uranium from plutonium and fission products is achieved. The entire uranium dioxide material is eventually dissolved in the chloride mixture; only the uranium and very little of the pultonium are deposited on the cathode, while the bulk of plutonium and of the fission products remains in the salt as chlorides. The fuel is thereby regenerated, and the salt gradually becomes enriched in fission products; the salt therefore has to be discarded from time to time after recovery of the plutonium, which may be accomplished in a manner described in the Benedict et al. patent cited above.

The process of this invention lends itself well to the direct production of fuel elements. According to one method, a carbon cathode of cylindrical shape or a tube of suitable cladding material is used. The uranium dioxide is deposited on the outside surface of said cathode or tube, until a layer of the thickness desired of the fuel element has been deposited. The outer surface of the uranium dioxide doposit, while still on the cathode, is then ground so as snugly to fit inside a metal jacket which is to be applied for protection against corrosion. Thereafter, if desired, the cathode with the deposit is cut into elements of the desired lengths. In the case of the graphite cathode, it is drilled out of the uranium dioxide element, and the inner surface of the element is ground in order to fit the outside of an inner jacket. This step is not necessary when a tube of suitable cladding material is used as the cathode. Finally, the ends are protected by metal pieces or caps.

It will be understood, of course, that elements of other types may also be produced.

In the following, two examples are given to illustrate the process of this invention.

*Example I*

Technical-grade uranium dioxide was dissolved by chlorination, in the manner described in the Benedict et al. patent, in a molten, anhydrous, equimolar mixture of sodium chloride and potassium chloride. Carbon electrodes were inserted and the mixture was subjected to electrolysis, while simultaneously sparging the bath vigorously. The conditions were as follows:

Temperature: 700° C.
Sparging gas: HCl with a trace of dry air.
Controlled electrode potential: —1.0 volt with respect to an Ag/1M AgCl reference electrode.

The cathode deposit was a dense, smooth-surface, self-supporting rod of uranium dioxide having a "ceramic" appearance in cross section and resembling fused uranium dioxide. It has the following properties.

Bulk density _____ g./cc__ 10.76
Oxygen-uranium ratio _____ 2.001 to 2.01
Impurities:
    Na _____ p.p.m__ 100
    K _____ p.p.m__ 200
    Cl _____ p.p.m__ 82

By way of contrast, the following Example II shows the effect of changing the conditions to eliminate, or at least minimize, the dissolution.

In this instance, anhydrous conditions were maintained but the bath was not sparged during electrolysis. Instead, the same type of gas was employed as a blanket over the surface.

*Example II*

Technical-grade uranium dioxide was dissolved by chlorination in an equimolar mixture of sodium chloride and potasssium chloride, and two graphite electrodes were inserted at a temperature of 720° C. A potential of —1.0 volt with reference to an Ag-AgCl electrode 1 molar AgCl in equimolar potassium-sodium chlorides was applied to a graphite electrode immersed in the bath. The gas blanketing the molten salt during the electrolysis consisted of 90 vol. percent of hydrogen chloride and 10 vol. percent of air, both having been previously subjected to a thorough drying process.

Instead of the coherent, ceramic-type deposit of Example I, large discrete uranium dioxide crystals were deposited on the cathode, the heaviest of which weighed about 300 mg. The crystals were of excellent-quality uranium dioxide and, upon analysis, showed a molar ratio of oxygen:uranium of between 2.001 and 2.01; the contaminants were 100 p.p.m. of sodium, 200 p.p.m. of potassium and 82 p.p.m. of chlorine. The density was found to be 10.76 g./cc.

The contaminants were concentrated in the surface areas of the crystals, and thorough washing of the crystals or bodies with water, or etching with nitric acid, removed a great fraction thereof. By this, the contaminants were reduced to a content of between 10 and 20 p.p.m. For the formation of fuel elements the crystals have to be ground and compacted by vibration.

By limiting the number of crystals on the cathode, still larger crystals can be produced. For instance, by enclosing the anode in a sheath having a number of tapering holes in it, or even in a funnel having only one opening, considerably larger crystals were obtained; apparently the confinement limited growth to a few crystals.

It will be understood that the invention is not to be limited by the details given herein but that it may be modified within the scope of the appended claims.

What is claimed is:

1. A process of producing a highly dense, substantially stoichiometric uranium dioxide from a uranium-dioxide raw material which comprises: dissolving said raw material in a molten chloride mixture selected from the group consisting of sodium chloride-potassium chloride, lithium chloride-potassium chloride, magnesium chloride-potassium chloride and lead chloride-potassium chloride, then, under completely anhydrous conditions, passing an electric current between an anode and a cathode immersed in said molten mixture while simultaneously passing a chlorinating gas, through said molten mixture, whereby uranium dioxide is deposited on said cathode and simultaneously partially redissolved from said cathode, the current, the temperature of the molten mixture, and the amount of chlorinating gas being so regulated that the rate of redissolution of said uranium dioxide is substantially less than, but at least 20% of, the rate of deposition on said cathode.

2. The process of claim 1 wherein said rate of redissolution is substantially 50% of said rate of deposition.

3. The process of claim 1 wherein the molten chloride mixture has a melting point below 800° C., and the operating temperature is within the range of 500 to 800° C.

4. The process of claim 1 wherein the chlorinating gas is a mixture of from 0 to 20% by volume of air and from 100 to 80% by volume of a gas selected from the group consisting of hydrogen chloride and chlorine.

5. The process of claim 4 wherein the chlorinating agent is a mixture of 10 parts by volume of hydrogen chloride and 1 part by volume of air.

6. The process of claim 1 wherein electrolysis is carried out by applying a negative potential up to −1.5 volts.

7. A process of regenerating neutron-irradiated uranium-dioxide fuel containing plutonium and fission products, comprising dissolving said fuel in an about equimolar mixture of sodium chloride and potassium chloride, passing a chlorinating gas through the molten mixture until said uranium dioxide, plutonium and fission products are dissolved, completely dehydrating said mixture, passing an electric current between electrodes immersed in said molten mixture at a current density of 0.04 to 0.2 amp/cm.$^2$ while simultaneously passing a chlorinating gas through said molten mixture, said chlorinating gas containing from 0 to 20% by volume of air and from 100 to 80% of a chlorinating agent selected from the class consisting of hydrogen chloride and chlorine, whereby a dense, fine-grained body of uranium dioxide of a formula between $UO_{2.001}$ and $UO_{2.01}$ is cathodically deposited while plutonium and fission products remain dissolved in the salt.

References Cited in the file of this patent
UNITED STATES PATENTS 1,821,176    Driggs _____ Sept. 1, 1931
3,011,865    Benedict _____ Dec. 5, 1961

UNITED STATES PATENT OFFICE
CERTIFICATE OF CORRECTION

Patent No. 3,114,682                            December 17, 1963

Frederick A. Scott et al.

It is hereby certified that error appears in the above numbered patent requiring correction and that the said Letters Patent should read as corrected below.

In the heading to the printed specification, in the title of invention, for "CHROMIUM" read -- URANIUM --.

Signed and sealed this 23rd day of June 1964.

(SEAL)
Attest:

ERNEST W. SWIDER
Attesting Officer

EDWARD J. BRENNER
Commissioner of Patents